Figure 1:
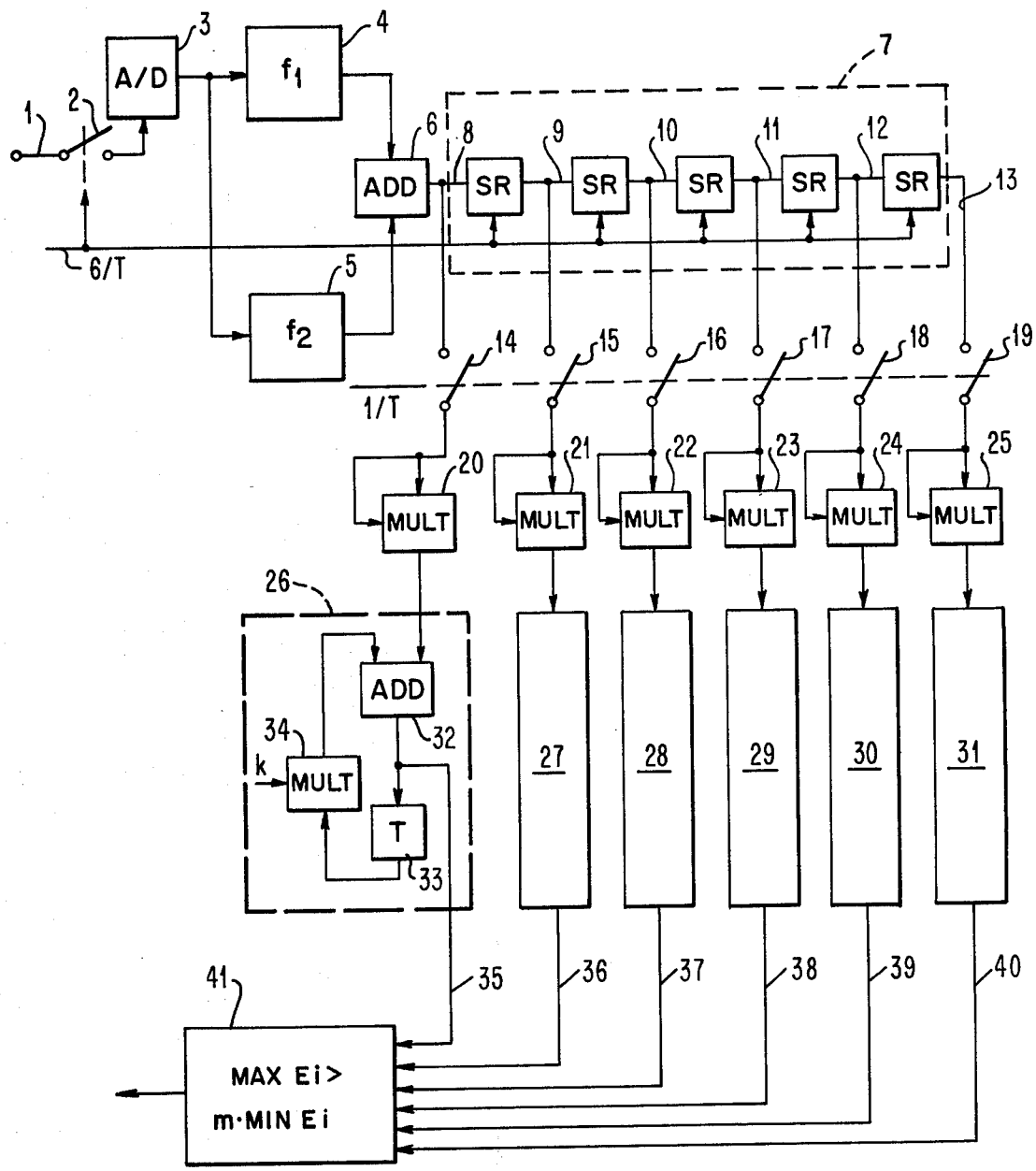

United States Patent [19]
Godard et al.

[11] 4,088,833
[45] May 9, 1978

[54] CARRIER DETECTOR

[75] Inventors: Dominique Noel Godard, Le Rouret; Andrzej Tadeusz Milewski, Saint-Jeannet, both of France

[73] Assignee: International Business Machines Corporation, Armonk, N.Y.

[21] Appl. No.: 740,642

[22] Filed: Nov. 10, 1976

[30] Foreign Application Priority Data
Nov. 28, 1975 France .................................. 75 36910

[51] Int. Cl.² .......................................... H04L 15/24
[52] U.S. Cl. ...................................... 178/88; 325/324
[58] Field of Search .................... 178/88, 68; 325/320, 325/322, 323, 325, 42, 478

[56] References Cited
U.S. PATENT DOCUMENTS

| | | | |
|---|---|---|---|
| 3,646,446 | 2/1972 | Rittenbach | 178/88 |
| 3,696,203 | 10/1972 | Leonard | 178/88 |
| 3,949,206 | 4/1976 | Edwards | 325/42 |

Primary Examiner—Benedict V. Safourek
Assistant Examiner—Michael A. Masinick
Attorney, Agent, or Firm—John B. Frisone

[57] ABSTRACT

The invention provides a carrier detector for use in a multipoint communication system. In these systems a common communication link interconnects a master modem to a plurality of remote slave modems and a slave modem has to initialize itself without disturbing transmission of data between the master modem and another slave modem. Initialization is to be performed on such data, and the slave modem must be provided with a detector capable of detecting when data is being transmitted. The invention describes such a detector which is independent of the received signal power.

The input signal is sampled at rate 6/T, T being the baud rate, and passed into two narrow band filters F1 and F2, centered at Nyquist frequencies $f_1$ and $f_2$, respectively.

The sum of the outputs from filters F1 and F2 is sampled at a rate of 1/T for each of six different phases of the sampling rate 1/T. The energy of the six samples so obtained is measured.

If only noise is received, the six measured energies must be theoretically equal; in practice, they will be of the same order of magnitude. When data is received, the six energies are very different. The indication "data is being transmitted" is given if the largest energy $E_{max}$ is greater than a fixed multiple of the smallest one $E_{min}$.

8 Claims, 8 Drawing Figures

A = AMPLITUDE
f = FREQUENCY

MAX (E1,E2)

MIN (E1,E2)

CARRIER DETECTOR

This invention relates to synchronous data transmission systems in which data is transmitted by modulating a carrier. More particularly, the invention relates to a carrier detector in such a system and capable of determining whether the signal received by a data receiver represents data or is noise.

A synchronous data transmission system includes at least two data terminals each connected to the same transmission line through a signal conversion device known as a modem. The function of a modem is to convert binary data supplied to an input data terminal into output signals compatible with the characteristics of the transmission line, which usually consists of a telephone line, and a complemental input transmission line signal to a digital output. A modem comprises a transmitter, which converts binary data to analog signals to be sent over the transmission line, and a receiver, which converts the received signals to binary data. In each modem, means must be provided to prevent transmission line noise from erroneously activating the receiver when no information is being transmitted. In the event of a noise pulse causing the modem's receiver to be activated, the received signal will carry no information and will be meaningless to the associated terminal, which will then initiate a request for retransmission. A similar process takes place at the other terminal of the transmission line and it may happen that mutual requests for retransmission are initiated by both terminals, even though nothing but noise is present on the line. A carrier detector is a device that makes it possible to determine whether the signal received from the transmission line is a data signal or noise.

The carrier detector has become an increasingly important modem feature as a result of the development of high-speed multipoint data transmission systems. In these systems, each of a number of data terminals is connected through a modem to a common transmission line. Not all such data terminals have the same degree of intelligence and, in general, only one of them, usually a computer, controls the entire system, with all data being exchanged between the computer and the other terminals. Generally, the modem associated with the computer is referred to as master modem while the other modems are called slave modems. When the system is to be activated and before any data is transmitted, for example, in the early morning, the master modem sends initialization signals over the common transmission line to enable the slave modems to adjust their individual receivers so that they will be ready to receive data. However, it frequently happens that a slave modem is not switched on at the time the initialization signals are transmitted by the master modem. When this slave modem is switched on at some later time, it will have to use the data signals exchanged between the computer and some other data terminal to adjust its receiver, in order to avoid perturbing the operation of the system. The slave modem must, therefore, be able to determine whether or not any signal present on the transmission line is a data signal before using it to adjust its receiver. This determination will be effected by the carrier detector of the modem.

The prior art teaches two main methods of detecting the carrier. In the first method, a device is used to detect any increase in the amplitude of the received signal, which increase is then interpreted as the beginning of a data signal. This method, while very simple, has a number of disadvantages, such as the fact that the device may be erroneously actuated if high amplitude noise is received. In addition, the detector, should it be switched on while a data signal is being transmitted, will fail to detect that signal since it is sensitive only to noise-to-data signal transitions. In the second method, the equalizer located in the receiver of the modem is used to determine whether a data signal is being received. The equalizer is operated in adaptive mode as soon as the modem is switched on and the received signal is detected as a data signal when the equalizer converges.

This method too has several disadvantages. If only noise is being received, the equalizer gains take on arbitrary values so that when a true data signal is later received, the equalizer is no longer capable of converging correctly. Also, the initial values of the equalizer gains must be reset at periodic intervals so that the device may be able to converge when a data signal occurs.

Accordingly, it is the object of the present invention to overcome the above difficulties by providing a method and a device for determining whether the signal received from the transmission line is a data signal, regardless of the amplitude of the received signal.

Generally stated, the method and the device proposed herein permit a determination of whether or not the signal received from the transmission line is a data signal, by . extracting from the received signal the frequency components $f_1 = f_c - \frac{1}{2}T$ and $f_2 = f_c + \frac{1}{2}T$, where $f_c$ is the carrier frequency and 1/T is the baud rate of data transmission signals;

. summing the amplitudes of the frequency components $f_1$ and $f_2$; sampling N times the sum thus obtained at each of N different phases of the signalling rate 1/T;

. measuring the energy of the N sampled sums;

. comparing the N energies with each other; and

. detecting the received signal as a data signal when the largest of the N energies differs substantially from the smallest one.

The foregoing and other objects, features and advantages of the invention will be apparent from the following more particular description of a preferred embodiment of the invention, as illustrated in the accompanying drawings.

FIG. 1 is a schematic diagram of a carrier detector in accordance with the present invention.

Figure 2A:
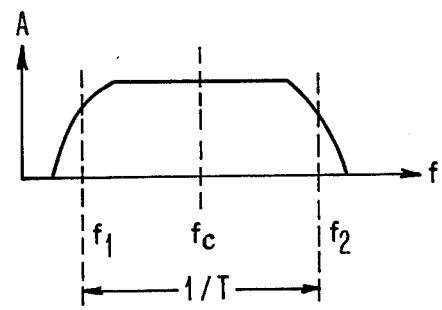
Figure 2B:
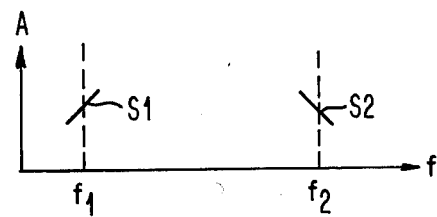
Figure 2C:
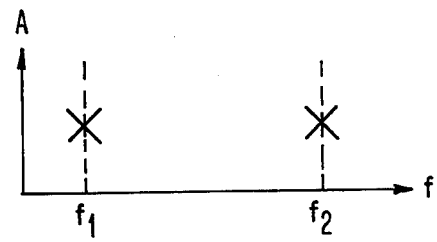

FIGS. 2A, 2B, and 2C represent the frequency spectrum of the signal at various points of the carrier detector.

Figure 3A:
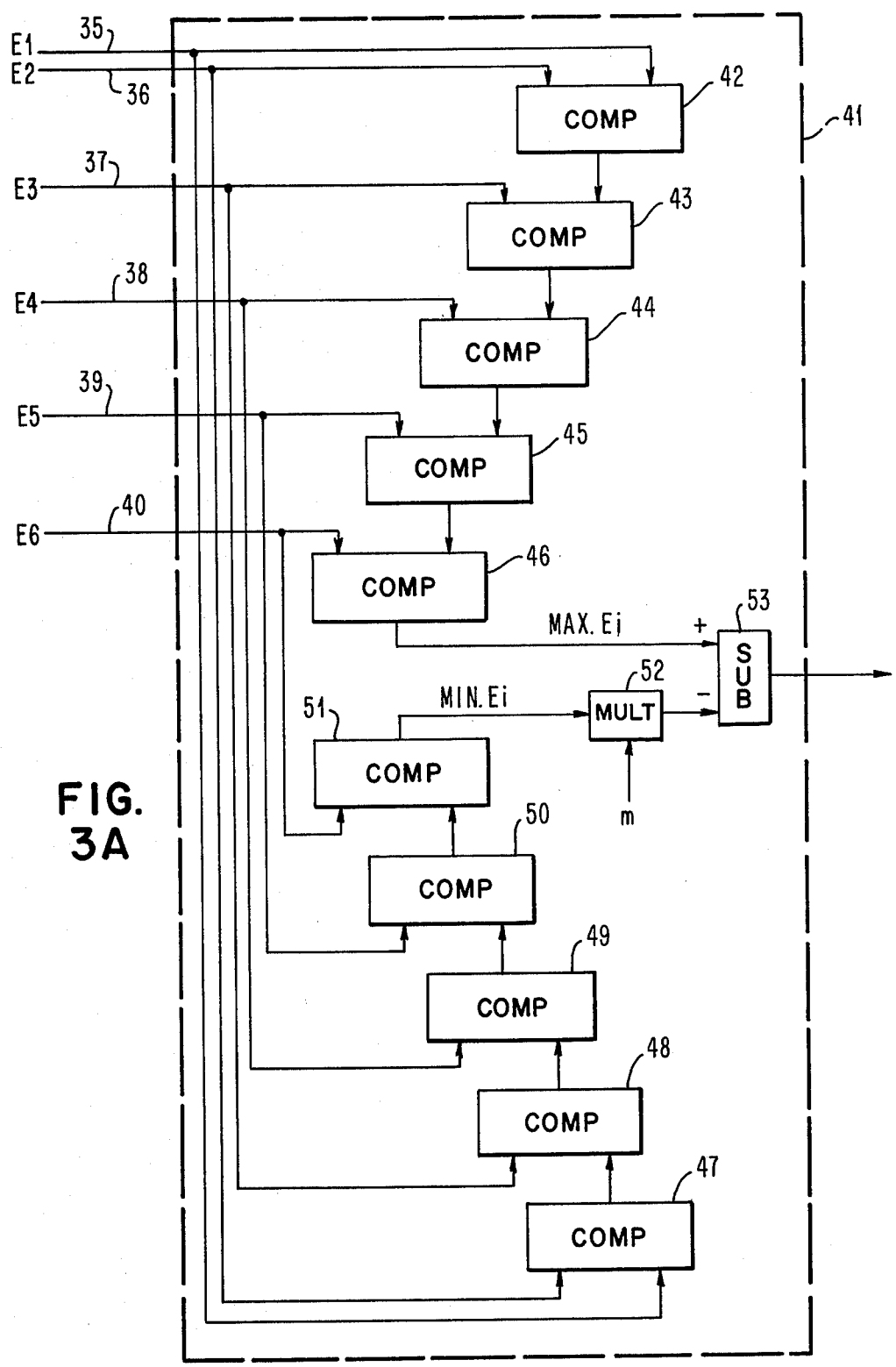
Figure 3B:
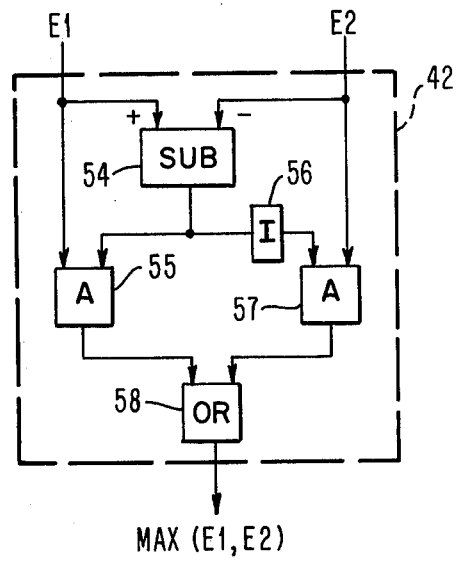
Figure 3C:
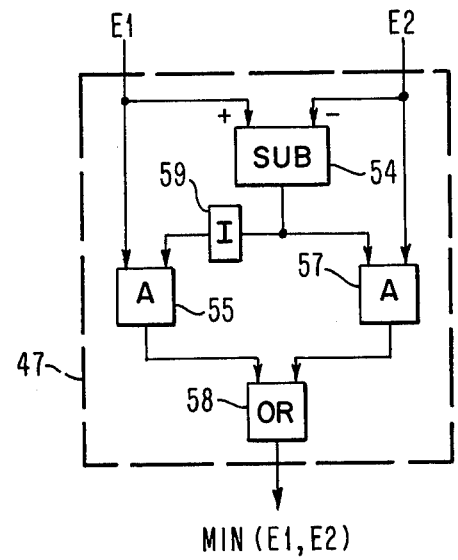

FIGS. 3A, 3B, and 3C illustrate an example of the decision logic which is shown in block form in FIG. 1.

Figure 4:
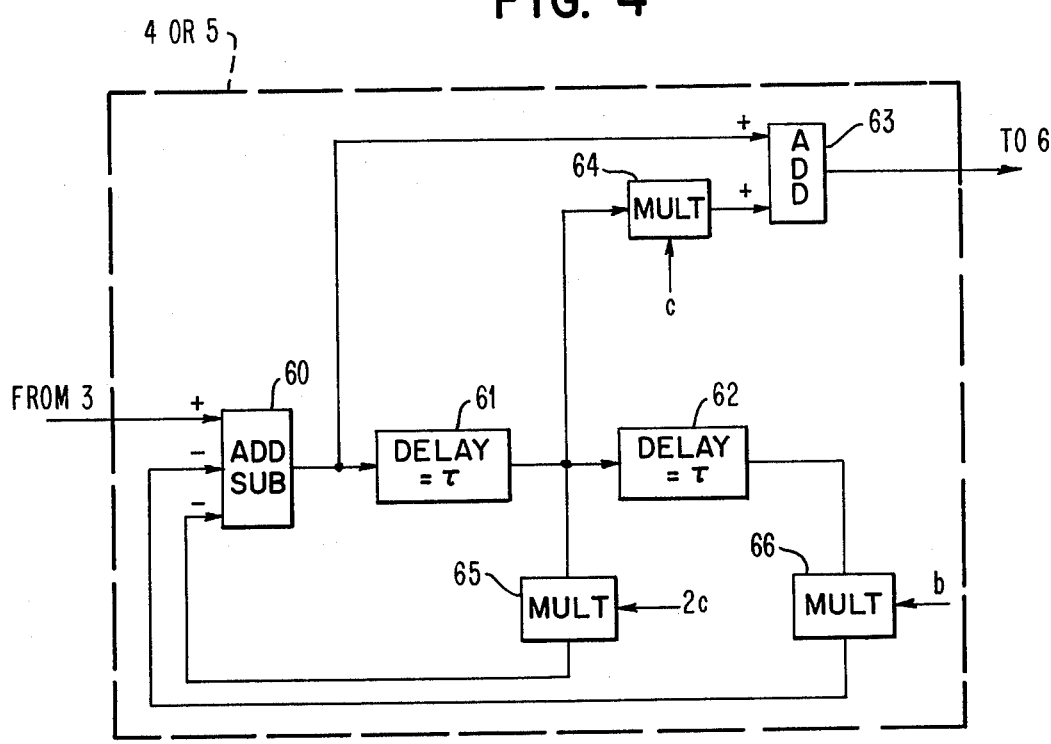

FIG. 4 illustrates an example of the digital filter shown in block form in FIG. 1.

In order that the invention may be more readily understood, it is believed appropriate to briefly review the general features of the synchronous data transmission systems in which data is transmitted by modulating a carrier. In such systems, the sequence of bits to be transmitted is first converted in the transmitter of the transmitting modem into a sequence of symbols, each of which can take on a number of discrete values that is generally equal to a power of two. These symbols are then transmitted sequentially at signaling instants which have a T-second spacing and are defined by a signaling rate 1/T, expressed in bauds, by varying by discrete changes, one or more parameters of a sinusoidal carrier of frequency $f_c$. To this end, considering the fact that the transmission lines have a limited passband, a different signal element having a frequency spectrum between 0 and $\frac{1}{2}T$ and modulated by the carrier, is generated for each different symbol. The spectrum of such modulated carrier as sent over the transmission line is limited by frequencies $f_1 = f_c - \frac{1}{2}T$ and $f_2 = f_c + \frac{1}{2}T$. In the receiver of the receiving modem, the value of the data symbols is recovered from the value of the parameters of the signal received at the signaling instants. For a more complete description, reference should be made, for example, to "Principles of Data Communication," by R. W. Lucky, J. Salz, and E. J. Weldon, Jr., published by McGraw-Hill, New York 1968. In order for the incoming signals to be correctly detected by the receiver, the local clock which determines the signaling instants for the receiver must be perfectly synchronized with that of the transmitter. U.S. Patent Application, Ser. No. 674,787, filed by F. Caron et al on Apr. 8, 1976, and corresponding to French Patent Application 75 14020, filed by the assignee of the present application on Apr. 25, 1975, describes a method of synchronizing the clock of the receiver to that of the transmitter. This method consists in extracting from the received signal the frequency components $f_1 = f_c - \frac{1}{2}T$ and $f_2 = f_c + \frac{1}{2}T$, and in adjusting the phase of the local clock in accordance with the value of the difference between phases $\phi 1$ and $\phi 2$ of these components, respectively. The clock of the receiver is perfectly synchronized with that of the transmitter when $\phi 1 = \phi 2$ at the sampling time. The present invention uses the latter fact to determine whether the received signal is a data signal. As previously mentioned, when a data signal is received and the local clock is perfectly synchronized with that of the transmitter, phases $\phi 1$ and $\phi 2$ of frequency components $f_1$ and $f_2$ are equal when sampled. At this point, it is convenient to proceed with the present description in terms of vectors and to represent each component by a vector, the amplitude of which is that of the component and the phase of which, relative to a fixed reference axis, is the phase of that component. It will thus be seen that when phases $\phi 1$ and $\phi 2$ 1 frequency components $f_1$ and $f_2$ are equal, the sum of these components, that is, the vector sum of the vectors representative of these components, is at its maximum value.

If the phase of the local clock is varied, phases $\phi 1$ and $\phi 2$ of frequency components $f_1$ and $f_2$ will no longer be equal when sampled and the sum of these components will vary until a minimum value corresponding to $\phi 1 = -\phi 2$ is reached. Thus, the sum of the frequency components $f_1$ and $f_2$ of a received data signal varies when the phase of the local clock is varied. On the other hand, when noise is received, the average energy of each of said components remains constant. In order to determine, in accordance with the invention, whether the received signal is a data signal, the frequency components $f_1$ and $f_2$ are extracted from the received signal and are added together, their sum is sampled N times at the signaling rate using N different phases of this signaling rate, the energy of each of the N sampled sums is measured, and the received signal is detected as a data signal when the largest of the N measured energies differs substantially from the smallest.

There will now be described a device embodying the method of the present invention, with reference to the appended figures.

FIG. 1 illustrates an exemplary digital embodiment of a carrier detector in accordance with the invention. The signal received via the transmission line 1 is applied to the input of a sampling device 2 shown as a switch and operating at a rate of 6/T. The output of sampler 2 is connected to the input of a conventional analog-to-digital converter 3, the output of which is applied in parallel to the inputs of two digital narrow-band filters 4 and 5, one embodiment of which is shown in FIG. 4 as an example. The digital outputs of filters 4 and 5 are connected to the inputs of a binary adder 6 whose output is connected to the input of a tapped delay line 7. Delay line 7 comprises six taps 8 through 13 with a time delay $\tau$ between adjacent taps, $\tau = T/6$ seconds. In practice, delay line 7 would consist of a 5-state digital shift register with each stage capable of storing one sum from adder 6. Taps 8 through 13 are respectively connected to the inputs of six sampling devices 14 through 19 and shown as switches. The outputs of devices 14 through 19 are respectively connected to both inputs of an associated one of six binary multipliers 20 through 25 to generate the squares of the sampled values. The outputs of multipliers 20 through 25 are respectively connected to the inputs of six digital integrators 26 through 31. For clarity, only one of the latter, integrator 26, has been shown in detail, and it is to be understood that the other integrators 27 through 31 are identical therewith. Conventionally, integrator 26 includes a binary adder 32 having one input connected to the output of multiplier 20. The output of adder 32 is connected to a delay means 33 which introduces a delay of T seconds. The output of delay means 33 is multiplied by an integration constant $k$ in a binary multiplier 34 whose output is applied to the other input of adder 32. The output of integrator 26 is available on line 35 at the output of adder 32. The outputs of integrators 26 through 31 are respectively connected via lines 35 through 40 to the inputs of a decision logic 31 having an output on line 42 which constitutes the output of the carrier detector.

The operation of the device of FIG. 1 will now be described.

The signal received from the transmission line 1, with a spectrum such as shown in FIG. 2A, is sampled by device 2 at a frequency higher than the signaling rate 1/T to prevent the spectrum of the sampled signal from folding around frequencies $f_1 = f_c - \frac{1}{2}T$ and $f_2 = f_c + \frac{1}{2}T$, as explained in the patent application cited above. In practice, a sampling rate equal to an integral multiple N of the signaling rate should be selected. In the example illustrated herein, a sampling rate N/T equal to 6/T has been selected. The sampled signal is converted to a digital signal by the analog-to-digital converter 3, the output of which is applied to the inputs of both narrow-band digital filters 4 and 5, centered at frequencies $f_1 = f_c - \frac{1}{2}T$ and $f_2 = f_c + \frac{1}{2}T$, respectively. Filter 4 provides low frequency component $f_1$ of the received signal, designated by s1 in FIG. 2B, and filter 5 provides the high frequency component $f_2$, designated by S2 in FIG. 2B. Adder 6, which receives as its inputs the outputs of filters 4 and 5, provides a signal having a spectrum which includes both components $f_1$ and $f_2$, designated S1 and S2, respectively, of the received signal. To sum components $f_1$ and $f_2$, as required by the present method, it is necessary to translate them into the same frequency domain. This is done by sampling the output signal of adder 6 at the signaling rate 1T, which results in a folding of the adder output spectrum around frequencies $f_1$ and $f_2$ since $f_1 = f_c - \frac{1}{2}T$ and $f_2 = f_c + \frac{1}{2}T$. Such a folding of the spectrum of the output signal of adder 6 is illustrated in FIG. 2C. Referring to the above statement of the method of the present invention, it will be seen that the sum of frequency components $f_1$ and $f_2$ of the received signal is obtained by using adder 6 to add up the outputs of filters 4 and 5 and performing the sampling operation at the signaling rate. According to the present method N different phases of the sum of the components will each be sampled at the rate 1/T or alternatively, the sum will be sampled at each of N different phases of the sampling rate 1/T. The first approach is used in the device shown in FIG. 1. In this device, a value of N=6 has been selected. The output signal of adder 6 is applied to the input of the delay line 7 whose six taps 8 through 13 have a time spacing $\tau = T/6$ seconds. The signals available at taps 8 through 13, therefore, will represent six different phases of the output signal of adder 6. These signals are simultaneously sampled at the rate 1/T by sampling devices 14 through 19 shown here as switches. The output signals of devices 14 through 19 represent, respectively, the sum of frequency components $f_1$ and $f_2$ of the received signal, as sampled at six different phases of the signaling rate frequency. Referring again to the above statement of the present method, it will be seen that the combination of adder 6, delay line 7 and the six sampling devices 14 through 19 constitutes a general means for sampling the sum of the components at N different phases of the 1/T rate. The energy of each of the output signals of sampling devices 14 through 19 is determined by conventional use of multipliers 20 through 25 and digital integrators 26 through 31. The representations of the six energies $E_1$ through $E_6$ are available at the outputs of integrators 26 through 31 and are applied via lines 35 through 40 to the input of decision logic 41. The function of decision logic 41, an exemplary embodiment of which will be described below with reference to FIGS. 3A through 3C, is to compare the representations of the six energies $E_1$ through $E_6$ with each other and to provide an output signal indicating that a data signal has been received when the largest of the energies, $E_{max}$, is substantially different from the smallest, $E_{min}$. In practice, decision logic 41 provides such an output signal when $$E_{max} > mE_{min}.$$

where $m$ is a weighting factor. It has been found that when $m=4$, satisfactory detection is obtained either with C1 conditioned telephone lines or with unconditioned telephone lines.

A ditigal embodiment of decision logic 41 will now be described with reference to FIGS. 3A through 3C. The decision logic 41 shown in FIG. 3A is essentially comprised of five "maximum" comparators 42 through 46, one embodiment of which is illustrated by way of example in FIG. 3B, and five "minimum" comparators 47 through 51, an exemplary embodiment of which is shown in FIG. 3C. The function of a "maximum" comparator is to compare the two quantities applied thereto as inputs and to provide at its output the greatest of these quantities. Similarly, a "minimum" comparator supplies the smallest of the two quantities applied to its input. In FIG. 3A, the representations of energies $E_1$ and $E_2$ available on lines 35 and 36 are applied to the inputs of maximum comparator 42, the output of which is connected to one of the inputs of maximum comparator 43, the other input of which receives the representation of energy $E_3$ from line 37. The output of maximum comparator 43 is connected to one of the inputs of maximum comparator 44, the other input of which receives a signal representing energy $E_4$ from line 38. The output of maximum comparator 44 is connected to one of the inputs of maximum comparator 45, the other input of which receives the signal representing energy $E_5$ from line 39. The output of maximum comparator 45 is connected to one of the inputs of maximum comparator 46, the other input of which receives a representation of energy $E_6$ from line 40. Thus, the maximum comparator 46 provides at its output the largest of the energies $E_1$ through $E_6$, i.e., $E_{max}$.

The representations of energies $E_1$ and $E_2$ are additionally applied to the inputs of a minimum comparator 47, the output of which is connected to an input of miminum comparator 48, the other input of which receives the signal representing energy $E_3$ from line 37. The output of minimum comparator 48 is connected to an input of minimum comparator 49, the other input of which receives the energy representing signal $E_4$ from line 38. The output of minimum comparator 49 is connected to an input of minimum comparator 50, the other input of which receives the energy representation $E_5$ from line 39. The output of minimum comparator 50 is connected to an input of minimum comparator 51, the other input of which receives the signal representing energy $E_6$ from line 40. Thus, minimum comparator 51 supplies at its output the smallest of energies $E_1$ through $E_6$, i.e., $E_{min}$. Energy $E_{min}$ $E_i$ is multiplied by the weighting factor $m$ in a digital multiplier 52 which, for a fixed $m$, may be simply a bit shifting circuit. The output of multiplier 52 is connected to the (−) input of a binary subtractor 53, the (+) input of which is connected to the output of maximum comparator 46. subtractor 53 determines the difference $$E_{max} - m \cdot E_{min}$$

and supplies a signal, for example a positive signal, when the sign of this difference is positive, i.e., when $$E_{max} > m \cdot E_{min}.$$

FIG. 3B illustrates an embodiment of a maximum comparator, e.g., 42. The quantities to be compared represent energies $E_1$ and $E_2$, and are respectively applied to the (+) and (−) inputs of a binary subtractor 54. The output of subtractor 54 which represents a plus value remainder is connected to one of the inputs of an AND gate 55, and the other input of which receives the input representing energy $E_1$. The output of subtractor 54 is also connected through an inverter 56 to one of the inputs of an AND gate 57, the other input of which receives the energy $E_2$ representation. The outputs of AND gates 55 and 56 are connected to the inputs of an OR gate 58, the output of which is the output of the comparator. In operation, if $E_1 > E_2$, then the output of subtractor 54 is at a positive level so that AND gate 55 is enabled and AND gate 57 is disabled. The digital value of energy $E_1$ is gated to the output of the comparator through AND gate 55 and OR gate 58. If $E_2 > E_1$, then AND gate 55 is disabled and the digital value of energy $E_2$ is gated to the output of the comparator through AND gate 57 and OR gate 58.

FIG. 3C illustrates an embodiment of a "minimum" comparator, e.g. 47. This comparator is similar to that of FIG. 3B except that the remainder sign output of subtractor 54 is directly connected to an input of AND gate 57 and goes through an inverter 59 to an input of AND gate 55. It will readily be seen that this comparator provides at its output the smaller digital value of the representations applied to its inputs.

Referring now to FIG. 4, there is described a digital embodiment of a narrow bandpass filter that can be used for each of the filters 4 and 5 of FIG. 1.

Conventionally, this filter consists of a recursive digital filter whose transfer function H(z) is defined as $$H(z) = \frac{1 + cz^{-1}}{1 + 2cz^{-1} + bz^{-2}}$$

where
$b = \mu^2$
$c = \mu \cos 2\pi f \tau$
$\mu$ is a constant close to unity, and
$f$ is the frequency at which the filter is centered.

The embodiment shown in FIG. 4 is a conventional embodiment directly derived from the expression for the transfer function H(z). The signal to be filtered from A/D converter 3, FIG. 1, is applied to the (+) input of a binary adder/subtractor 60, the output of which is connected to the input of a delay line comprising three taps and two delay elements 61 and 62 each introducing a delay of $\tau$ seconds. In practice, the delay line would consist of a multi-denominational, two-stage shift register. The first tap, located at the input of the delay line, is connected to an input of a binary adder 63, the output of which is the output of the filter. The second tap is connected to an input of a binary multiplier 64, the other input of which receives the value of coefficient $c$. The output of multiplier 64 is connected to the other input of adder 63. The second tap is also connected to an input of a binary multiplier 65, whose other input receives the doubled value of coefficient $c$. The output of multiplier 65 is connected to a (−) input of adder/subtractor 60. The third tap is connected to an input of a binary multiplier 66, the other input of which receives the value of coefficient $b$. The output of multiplier 66 is connected to another (−) input of adder/subtractor 60.

It should be noted that in the device shown in FIG. 1, six multipliers 20 through 25 are respectively connected to the outputs of sampling devices 14 through 19, to facilitate understanding of the operation of the device. However, in practice a single multiplier located between the output of adder 6 and the input of delay line 7 could be substituted for the six multipliers 20 through 25.

The carrier detector described above was tested using the following values:

$f_c = 1800$ Hz; $f_1 = 1000$ hz; $f_2 = 2600$ Hz;
$T = 1/1600$ sec.; $1/\tau = 6/T$; $m = 4$
and $\mu = 0.99$.

Under these conditions, satisfactory detection was obtained either with C1 conditioned telephone lines or with unconditioned telephone lines.

While the invention has been particularly shown and described with reference to a preferred embodiment thereof, it will be understood by those skilled in the art that numerous changes in form and detail may be made therein without departing from the spirit and scope of the invention.

What is claimed is:

1. A method for determining whether the signal received by the receiver in a synchronous data transmission system wherein data is transmitted by modulating a carrier, is a data signal or noise, said method being characterized in that it includes the steps of:
    a. extracting from the received signal the frequency components $f_1$ and $f_2$ respectively defined as $f_1 = f_c - \frac{1}{2}T$ and $f_2 = f_c + \frac{1}{2}T$ where
    $f_c$ is the carrier frequency, and
    $T$ is the signaling period;
    b. summing said components;
    c. sampling the summed components at the rate 1/T for each phase of N different phases of said rate 1/T, thereby providing N sum samples;
    d. measuring the energy of each of said N sum samples for each of the N phases; and
    e. comparing the N energies thus obtained with each other, and
    f. indicating that the received signal is a data signal when the largest of the N energies is greater than a predetermined multiple of the smallest one.

2. A method according to claim 1, characterized in that said step a, is preceded by the step of sampling the received signal at the rate N/T, where N > 1.

3. A device for determining whether the signal received by the receiver in a synchronous data transmission system wherein data is transmitted by modulating a carrier, is a data signal or noise, said device being characterized in that it includes:
    filtering means for extracting from the received signal the frequency components $f_1$ and $f_2$ defined as $f_1 = f_c - \frac{1}{2}T$ and $f_2 = f_c + \frac{1}{2}T$ where
    $f_c$ is the carrier frequency, and
    $T$ is the signaling period;
    means connected to said filtering means for sampling the sum of these components at the rate 1/T, for each of N different phases of said rate 1/T, thereby providing N sum samples;
    means receiving said N sum samples and determining the energy of each of said N sum samples; and
    means receiving values representing the energies of said N sum samples and comparing the values of these N energies with each other and indicating that the received signal is a data signal when the largest of the energies is greater than a predetermined multiple of the smallest one.

4. A method for determining whether the signal received by the receiver in a synchronous data transmission system wherein data is transmitted by modulating a carrier, is a data signal or noise, said method being characterized in that it includes the steps of:
    a. extracting from the received signal the frequency components $f_1$ and $f_2$ respectively defined as $f_1 = f_c - \frac{1}{2}T$ and $f_2 = f_c + \frac{1}{2}T$ where
    $f_c$ is the carrier frequency, and
    $T$ is the signaling period;
    b. summing said components;
    c. sampling N different phases of the sum of said components at the rate 1/T;
    d. measuring the energy of each of said N sum samples; and e. comparing the N energies thus obtained with each other, and indicating that the received signal is a data signal when the largest of the N energies is greater than a predetermined multiple of the smallest one.

5. A method according to claim 4, characterized in that said extracting step is preceded by the step of sampling the received signal at the rate N/T where $N > 1$.

6. A device for determining whether the signal received by the receiver in a synchronous data transmission system wherein data is transmitted by modulating a carrier, is a data signal or noise, said device being characterized in that it includes:

filtering means for extracting from the received signal the frequency components $f_1$ and $f_2$ defined as $$f_1 = f_c - \tfrac{1}{2}T \text{ and } f_2 = f_c + \tfrac{1}{2}T$$

where
- $f_c$ is the carrier frequency, and
- $T$ is the signaling period;

means connected to said filtering means for generating the sum of said components;

means connected thereto for sampling N different phases of said sum at the rate 1/T, thereby providing N sum samples;

means receiving said N sum samples to determine a value representing the energy of each of said N sum samples; and means receiving the values of the energies of said N sum samples and comparing the values of these N energies with each other said means indicating that the received signal is a data signal when the largest of the emergies is greater than a predetermined multiple of the smallest one.

7. Device according to claim 6, characterized in that said means for sampling said N different phases of the sum of the components include:

an adder for summing the components extracted by said filtering means;

a delay line receiving the output of said adder and comprising N taps with a time spacing of T/N seconds between adjacent ones of said taps; and a sampling means connected to each of said N taps for simultaneously sampling at the rate 1/T the signals available at the N taps.

8. Device according to claim 7, characterized in that it further includes a sampling device for sampling the received signal at the rate N/T, where $N > 1$, said device being located upstream of said filtering means.

* * * * *